July 10, 1956 J. R. McGRATH ET AL 2,754,149
CONVERTIBLE AUTOMOBILE TOP WITH TELESCOPING SECTIONS
Filed March 11, 1953 2 Sheets-Sheet 1
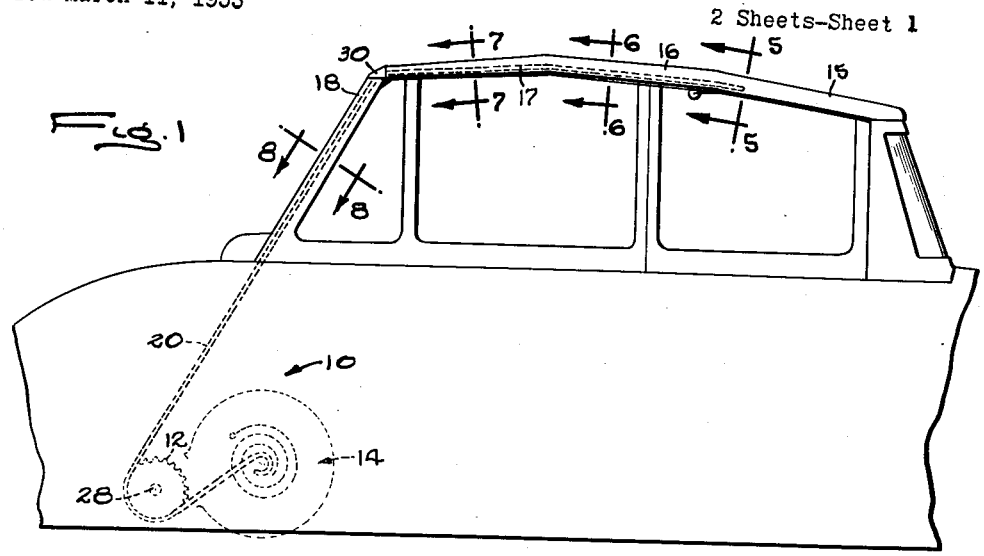
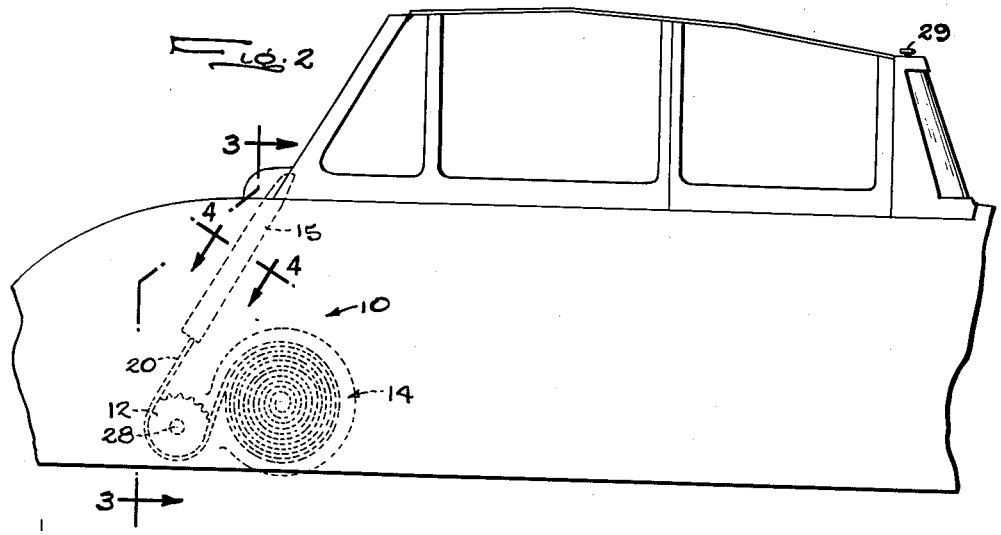
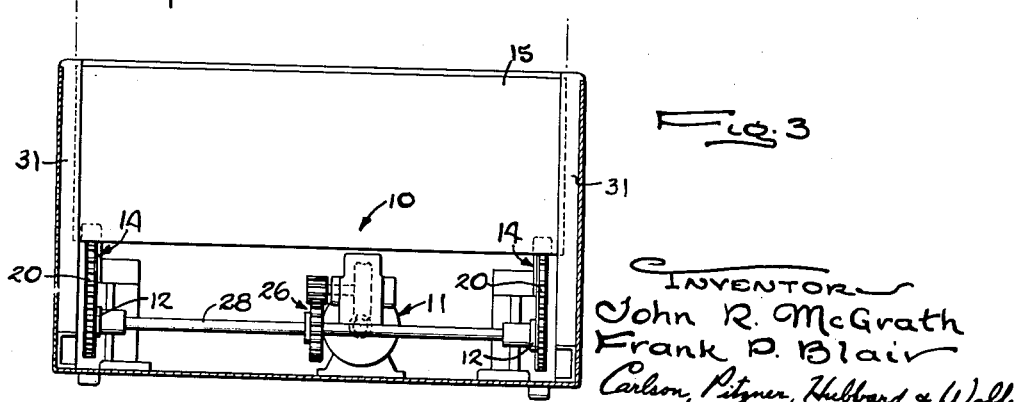
INVENTORS
John R. McGrath
Frank D. Blair
Carlson, Pitzner, Hubbard & Wolfe
ATTORNEYS

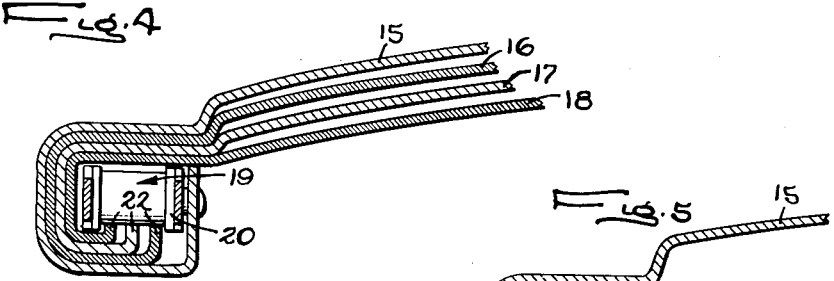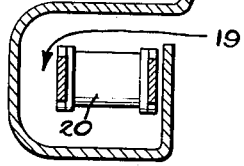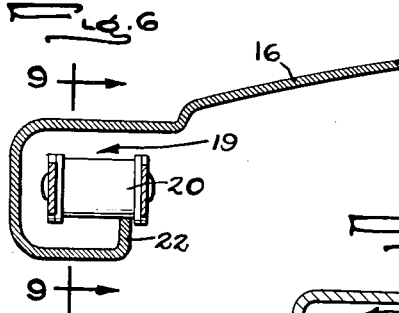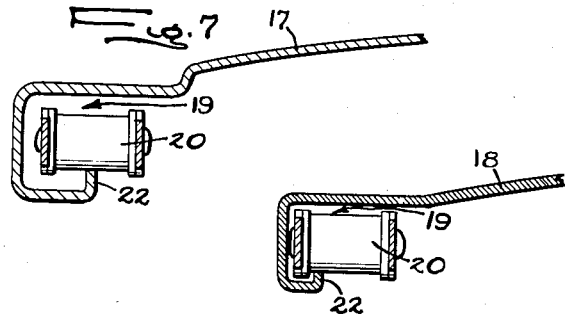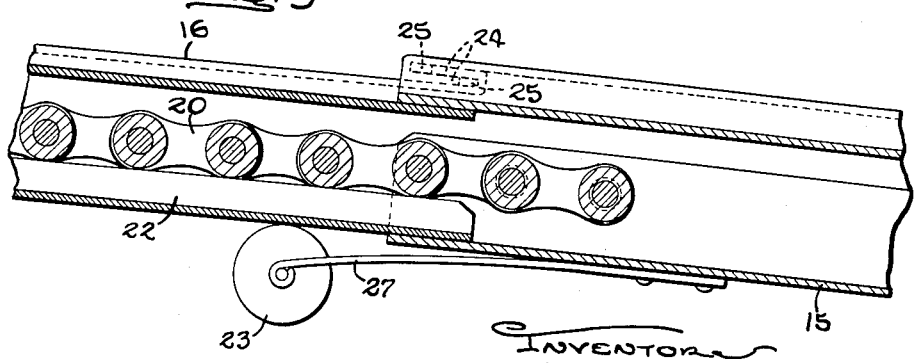

United States Patent Office 2,754,149
Patented July 10, 1956

2,754,149

CONVERTIBLE AUTOMOBILE TOP WITH TELESCOPING SECTIONS

John R. McGrath, Elmhurst, and Frank P. Blair, Chicago, Ill.

Application March 11, 1953, Serial No. 341,704

3 Claims. (Cl. 296—107)

The present invention relates to convertible type automobile tops, particularly those susceptible to fabrication of formable sheet material such as sheet metal, plastic, and the like. The invention is readily embodied in the conventional convertible type automobile. Particular, although not exclusive, utility is found for the invention on that type of convertible where the side and top portions of the windows are surrounded by a permanent structural member.

It is an object of the invention to provide a rigid convertible type automobile top which operates fully automatically to retract as well as to reengage itself into closed position.

Another object of the invention is to provide a convertible type telescoping rigid automobile top in which the elements necessary to achieve fully automatic operation are self-contained within the confines of a closed unit.

Yet another object of the invention is to provide a convertible type rigid automobile top in which the rigid sections telescope progressively within each other upon retraction and which extend into the closed position in the reverse order of retraction.

Still another object of the invention is to provide a convertible type rigid automobile top which is actuated by a chain which functions in both tension and compression for purposes of retracting and closing the top.

Further objects and advantages of the invention will become apparent as the following description proceeds, taken in connection with the accompanying drawings, in which:

Figure 1 is a longitudinal sectional view of an automobile which exemplifies the convertible top of the invention.

Fig. 2 is a longitudinal partial sectional view of the same automobile shown in Fig. 1; however, it shows the position of the top at its fully retracted station.

Fig. 3 is a transverse partial sectional view along the line 3—3 in Fig. 2 of the operating mechanism for the convertible top looking forward from the rear bumper of the automobile.

Fig. 4 is an enlarged cross sectional view along the line 4—4 in Fig. 2 of a transverse section through a support edge of the top showing all of the metallic closure elements in a nested position.

Fig. 5 is a transverse sectional view along the line 5—5 in Fig. 1 showing the support portion of the forward section of the automobile top.

Fig. 6 is a view similar to Fig. 5 except taken along the line 6—6 in Fig. 1 and showing the second section or middle section of the top closure.

Fig. 7, taken along the line 7—7 in Fig. 1 similarly shows a transverse section of the third or rear top closure section.

Fig. 8 is taken along the line 8—8 in Fig. 1 and shows a transverse sectional view of the edge portion of the rear window closure element of the convertible metallic top.

Fig. 9 is a longitudinal partial sectional view of the edge or support portion of the convertible top at the junction between the forward and middle sections of the convertible top.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

In the present instance, the invention has been shown as embodied in a convertible small sport type automobile having a permanent side frame structure above the side windows. The particular automobile shown is popularly known as the Nash Rambler. It will be noted that the construction proposed can be adapted to such a type automobile without substantial changes in its external construction. The type of convertible top contemplated by the invention is, however, readily adaptable to any conventional convertible type automobile.

Shown in Figs. 1, 2, and 3 is driving unit 10 comprising the driving motor 11 and two sprockets 12 and chain reels 14. The entire unit is readily recessed in the forward portion of the trunk. Thus a minimum of space is employed for concealing the convertible top and its drive in its retracted position.

Referring now more particularly to Fig. 1, it will be seen that the top is comprised of four telescoping sections being, respectively, the forward section 15, mid-section 16, rear section 17, and back window section 18. The successive portions of the four closure units 15, 16, 17, and 18 become progressively smaller as one proceeds from the front to the rear of the automobile top construction. This insures the preferred retracting operation in which the forward section is the outer section when in the fully nested position as disclosed in Fig. 2. It will be appreciated, of course, that this order may be reversed without changing the spirit of the invention.

When the convertible top sections are in the fully nested position as shown in Fig. 2, the edge or support sections define a central closed rectangular tube 19, as shown in Fig. 4. The operating chain 20 is positioned in the rectangular tube 19 of the outer edge section. The end portions of the sections 16, 17, and 18 are each bent up presenting chain support edges 22 for the chain rollers.

The ultimate effect of this construction is to provide a closely spaced chamber in which the chain operates. By confining the chain 20 in the closed end sections 19 of the convertible tops, it is constrained to such an extent that it can be employed in compression as well as in its usual function as a tension element.

As illustrated in Figs. 4 and 9, it will be seen that the chain is anchored at its far end to the forward portion 15 of the convertible top. The middle section 16, shown in cross section of Fig. 6, terminates at its support edge 22 located adjacent the inner portion of the chain roller. Fig. 7 shows the cross sectional end construction of the rear top portion 17 of the convertible top with support edge 22 acting as a post under the chain roller at its mid-point. Fig. 8 shows the rear window portion 18 of the convertible top, its inner edge being bent upward to provide support 22 for the outer portion of the rollers of the operating chain. The support edges of all four sections of the convertible top are concentrically arranged with a generally rectangular configuration affording a mutually sliding contact.

The locking relationship between the transverse edges of the successive portions of the telescoping convertible top is effected by a double overlap as shown in Fig. 9. It will be seen that the lateral edges 24 of the mating sections are curled to form an interlocking grip. Felting, rubber, or other suitable packing material 25 provides a cushion as well as waterproofing between the adjacent top sections in their locked position.

As illustrated in Fig. 9, a roller 23 is fastened to the forward unit 15 of the convertible top by means of a leaf type spring 27. The combination of the force of the spring loaded roller working on the under side of adjacent sections of the top effects an alined relationship between adjacent top sections. As will be outlined later in greater detail, this action becomes quite important when the top retracts over the rear window portion 18.

The driving unit, as shown in Fig. 3, comprises an electric motor 11, reduction gear 26, and transverse drive shaft 28 at the ends of which chain sprockets 12 are mounted. A simple reverse switch (not shown) is provided for the electric motor 11 conveniently located for access and operation by the driver.

In operation from the closed position the driver first releases the top latch lock 29. Upon the release of the lock the spring 27 acting on the alining roller 23 counterbalances the weight of the front section 15 thereby alining it to telescope over the mid-section 16. Then the motor is actuated by the driver throwing the motor switch to the "open" position. The chain sprockets 12 begin to turn slowly tensioning the chain 20 which in turn pulls the forward portion 15 of the convertible top into its nested position over the mid-section 16. Thereafter, as the chain 20 continues to wind up in the reel 14 the nested front 15 and mid-sections 16 move simultaneously over the rear section 17. By simply throwing the switch the top can, of course, be left at any mid-position desired. As the chain 20 continues winding the nested front, mid, and rear sections 15, 16, and 17, respectively, hinge upwardly before sliding down over the rear window section 18. The combined action of the alining roller 23 and spring 27 hinges the top three nested sections into an alined postion for telescoping over the rear window section. Subsequently, the four nested sections proceed downwardly into the envelope 31 for the entire convertible top.

When the driver desires to return the convertible top to its closed position over the top of the car, he reverses the electric switch provided at the dashboard which energizes the motor in the opposite direction. A conventional D. C. easily reversible type motor is contemplated. This immediately causes the sprockets 12 to turn in a clockwise direction (viewed as in Figs. 1 and 2) placing the retracting chain in compression. The entire nested top moves upwardly out of the envelope 31 until the rear window portion 18 is in position. At this time the three top sections, 15, 16, and 17, as nested, move upwardly until they have completely passed the rear window portion 18. The weight of the top three units hinges them down over the rear side window elbow 30 and into running position along the side windows. As the electric motor continues to turn compressing the chain forwardly, the forward section 15 and mid-section 16 of the convertible top extend beyond the rear top sectional portion 17 until the forward mid-portions are extended covering the middle of the top above the automobile. As each successive section extends, the transverse edges 24 shown in Fig. 9 lock in overlapping relationship. When the front section 15 has extended fully, a suitable limit switch automatically turns off the electric motor 11. Thereafter, the forward locking latch 29 is manually engaged, completing the closing operation.

In the closed position, all the sections of the convertible top interlock with each other into a smooth continuous top section insulated against vibration and leakage at the interlocking edge portions.

We claim as our invention:

1. A retractable top for passenger carrying vehicles comprising, in combination, a plurality of closure sections, the forward one of said closure sections having its lateral edges bent inwardly forming flanking rectangular channels, each successive closure section having its lateral edges bent inwardly and then upwardly forming an upstanding supporting edge, said successive section lateral edges proportioned for a nesting relation successively within each other, an alining roller fixed to said forward top section yieldably engaging its adjacent closure section, said upstanding supports defining a rectangular path within said lateral edges, and driving means confined within said path fixedly mounted to said forward closure section.

2. In a retractable top for passenger carrying vehicles, the combination comprising a plurality of rigid substantially rectangular top sections including a forward one, channels formed on the lateral edges of said top sections, said channels being proportioned for successive telescoping within each other, upstanding supports forming the inner wall of said channels in all sections except the forward one, overlapping interlocking grips formed along the transverse edges of said top sections, a chain drive nested within the confined path formed by said edge channels, said chain drive being secured adjacent one of its ends to the forward top section, an aligning roller yieldably secured to said forward top section for engagement with each succeeding section as telescopic action occurs, driving means engaged with said chain drive adjacent its other end selectively compressing or tensioning said chain drive, and an envelope proportioned and aligned to receive said nested top sections.

3. In a retractable top for vehicles, the combination comprising rigid substantially rectangular top sections including a forward one, channels formed on the lateral edges of said top sections, said channels being proportioned for successive telescoping within each other, supports forming the inner wall of said channels on all sections except the forward one, overlapping interlocking grips formed along the transverse edges of said top sections, a chain drive nested within the confined path formed by said edge channels, means securing said chain drive adjacent one of its ends to the forward one of said top sections, in aligning roller yieldably secured beneath said forward top section for engagement with each succeeding adjacent section as telescopic action occurs, and driving means engaging the other end of said chain drive selectively compressing or tensioning said chain.

References Cited in the file of this patent

UNITED STATES PATENTS

| 337,831 | Good et al. | Mar. 16, 1886 |
| 1,873,990 | Alexander | Aug. 30, 1932 |
| 1,903,240 | Mayer | Mar. 28, 1933 |
| 2,623,779 | Catell | Dec. 30, 1952 |

FOREIGN PATENTS

| 625,871 | France | Aug. 22, 1927 |
| 223,789 | Great Britain | Oct. 30, 1924 |
| 291,829 | Great Britain | June 7, 1928 |
| 349,172 | Great Britain | May 28, 1931 |